United States Patent [19]

Weidner

[11] 4,141,298
[45] Feb. 27, 1979

[54] ELECTRONIC IGNITION CIRCUIT

[75] Inventor: Peter F. Weidner, Breitenbrunn, Fed. Rep. of Germany

[73] Assignee: Diehl GmbH & Co., Nüremberg, Fed. Rep. of Germany

[21] Appl. No.: 849,266

[22] Filed: Nov. 7, 1977

[30] Foreign Application Priority Data

Nov. 25, 1976 [DE] Fed. Rep. of Germany ....... 2653452

[51] Int. Cl.² .............................................. F42C 11/02
[52] U.S. Cl. ...................................... 102/210; 102/220
[58] Field of Search ............... 102/206, 210, 215, 218, 102/219, 220

[56] References Cited

U.S. PATENT DOCUMENTS

| 3,359,904 | 12/1967 | Nerheim | 102/210 |
| 3,382,804 | 5/1968 | Lehmann et al. | 102/219 |
| 3,653,324 | 4/1972 | Furlani et al. | 102/215 |
| 3,808,975 | 5/1974 | Stutzle et al. | 102/210 |
| 3,859,746 | 1/1975 | Pecksen | 102/210 |
| 3,941,058 | 3/1976 | Gawlick et al. | 102/210 |

Primary Examiner—Charles T. Jordan
Attorney, Agent, or Firm—Scully, Scott, Murphy & Presser

[57] ABSTRACT

An electronic ignition circuit for the self-destruction of a projectile fuse, including two condensers chargeable from a single generator, such as a piezoelectric cell. A delay circuit initiates the discharge of the first condenser through an igniter, with the generator raising the voltage of the first condenser to a level necessary for the igniter and that of the second condenser required for operation of the delay circuit.

9 Claims, 1 Drawing Figure

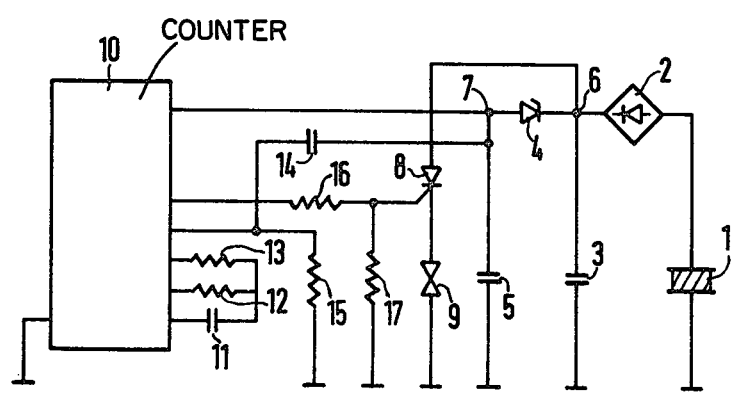

ELECTRONIC IGNITION CIRCUIT

BACKGROUND OF THE INVENTION

1. Field of the Invention

The present invention relates to an electronic ignition circuit for the self-destruction of a projectile fuse with two condensers which are chargeable through the intermediary of a generator, and including a delay circuit for initiating the discharge of the first condenser through an igniter, particularly a gap igniter, wherein the generator raises the first condenser to a voltage which is necessary for the igniter and the second condenser to the voltage required for the delay circuit.

2. Discussion of the Prior Art

An ignition circuit of this type is described in German Laid-open Patent Specification No. 2,143,119. In this circuit the ignition charge condenser is charged at the end of the accelerating phase of the projectile through a diode at the unloading of piezoelectric cells. The delay circuit is formed by a recharging circuit. In this instance, no specialized demands are made on the selection of the voltage for the ignition charge condenser and a condenser of the recharging circuit.

SUMMARY OF THE INVENTION

Accordingly, it is an object of the present invention to propose an ignition circuit wherein there stands available at the first condenser (ignition charge condenser) a high voltage at low capacitance, particularly for the ignition of a gap igniter, and wherein the second condenser delivers a low voltage at a high capacitance, in particular for supplying an independent delay circuit.

Pursuant to the invention, the above object is readily achieved in that the capacitance of the first condenser is measured in conformance with the voltage and energy required for the ignition of the igniter, and the capacitance of the second condenser in conformance with the voltage and energy necessary for the operation of the delay circuit, and wherein a semiconductor element is connected between the voltage potential poles of the two condensers, which becomes conductive in accordance with a voltage threshold value and which prevents a charge equalization between the two condensers, whereby this voltage threshold is slightly below the voltage which can be reached upon the charging of the first condenser and corresponds to the difference between the voltages necessary for the igniter and for the delay circuit. Hereby, both condensers allow themselves to be brought to different voltages and charges by the same generator. A battery becomes superfluous.

In a preferred embodiment of the invention, the second condenser is connected to the supply voltage input of a delay circuit, in which the extent of the delay period is independent of the voltage of the condenser. Such a delay circuit, for example, may be constituted of a counter.

BRIEF DESCRIPTION OF THE DRAWING

Further advantageous features of the invention may be readily ascertained from the following detailed description of the invention, taken in conjunction with the single FIGURE of the accompanying drawing showing an exemplary embodiment of the electronic ignition circuit.

DETAILED DESCRIPTION

An ignition circuit evidences a piezoelectric cell 1 forming a generator. A bridge rectifier 2 is connected to the output of the cell so that the half wave which appears during the loading phase, as well as during the discharge phase, can be synonymously evaluated. Connected in parallel with the series circuit formed by cell 1 and rectifier 2 is a first condenser 3 and the series circuit consisting of a zener diode 4 and a second condenser 5. The zener diode 4 is connected between the respective voltage or potential poles 6 and 7 of the two condensers 3 and 5.

Connected to the voltage potential pole 6 of the first condenser 3 is a thyristor 8, the latter of which has a gap igniter 9 connected to its output. The voltage potential pole 7 of the second condenser 5 is connected to a supply voltage terminal of a counter 10 which is formed by an integrated switching circuit (for example, CD 4060A). The switching circuit is actuated from externally thereof by the elements 11, 12 and 13. In this instance, by means of the condenser 11 and the resistor 12 there is set the frequency of an oscillator which is integrated in the switching circuit. The reset input of the counter 10 is connected to the voltage or potential pole 7 through a condenser 14. Moreover, a resistor 15 is located at the reset input. The output of the counter 10 is connected through a resistor 16 to the control electrode of the thyristor 8. A resistor 17 is connected to the control electrode.

In actual practice, the value of the condenser 3 lies at about 33 nF, and that of the condenser 5 at 3.2 $\mu$F. The zener voltage of the zener diode 4, for example, is 70 V. After the charging of the two condensers by means of the piezoelectric cell 1, there is present a voltage of about 80 V at the condenser 3 and a voltage of about 10 V at the condenser 5.

The above-described circuit operates in the following manner:

During the loading phase, the piezoelectric cell 1 charges a positive half wave to the condenser 3 through the rectifier 2. As soon as the voltage present at condenser 3 exceeds the zener voltage of the zener diode 4, the latter becomes conductive. The condenser 5 is charged correspondingly. The half wave of the piezoelectric cell 1 which occurs during the discharge phase, in effect after leaving the conduit, is rectified and charges the condenser 5 further. In correspondence with the voltage increase at the condenser 5, there is subsequently charged the condenser 3. After termination of the charging of the condensers, under the prerequisite of the previously given values, the condenser 5 possesses a higher charge than the condenser 3 by a factor of about 12.

At the exceeding of the zener voltage a reset impulse is conducted through the condenser 14 to the counter 10. This impulse sets the counter back to zero. As soon as the condenser 5 is sufficiently charged, the counter 10 commences running. After a time interval which is dependent upon the values of the elements 11 and 12, a signal appears at the output of the counter 10 which switches the thyristor into a conductive condition, so that the charge of the condenser 3 is suddenly discharged at the igniter 9.

The proposed inventive circuit provides the capability of charging two energy accumulators which are different in voltage and charge capacity and independent of each other by means of a single generator, whereby each storage can be precisely correlated with the necessary values of its associated circuit portion. The power output which becomes available from the piezoelectric cell 1 is utilized in an optimum manner.

What is claimed is:

1. In an electronic ignition circuit for the self-destruction of a projectile fuse, including two condensers; a generator for charging said condensers; and a delay circuit for initiating the discharge of a first of said condensers through an igniter, said generator charging said first condenser to a voltage required for said igniter and charging the second condenser to a voltage required for said delay circuit, the improvement comprising: said first condenser having a capacitance commensurate with the voltage and energy required for the ignition of said igniter and said second condenser having a capacitance commensurate with the voltage and energy required for the operation of said delay circuit; a semiconductor element being connected between the voltage potential poles of said condensers, said element being conductive above a voltage threshold value and preventing a charge equalization between said two condensers, said voltage threshold value being slightly below the voltage attainable at charging of said first condenser and corresponds to the difference between the voltages required for said igniter and for said delay circuit.

2. A circuit as claimed in claim 1, said igniter comprising a gap igniter.

3. A circuit as claimed in claim 1, said second condenser being connected to the supply voltage input of said delay circuit in which the course of the delay period is independent of the voltage of said second condenser.

4. A circuit as claimed in claim 1, comprising a zener diode, said second condenser and said diode forming a series circuit, said first condenser being connected in parallel with said series circuit.

5. A circuit as claimed in claim 1, comprising a bridge rectifier, said rectifier and said generator forming a series circuit, said first condenser being connected in parallel with said series circuit.

6. A circuit as claimed in claim 5, said generator comprising a piezoelectric cell.

7. A circuit as claimed in claim 1, said delay circuit comprising a digital counter.

8. A circuit as claimed in claim 1, said second condenser having a capacitance in a ratio of about 100:1 relative to the capacitance of said first condenser.

9. A circuit as claimed in claim 7, comprising a further condenser connected intermediate the voltage potential pole of said second condenser and a reset input of said counter.

* * * * *